(No Model.)
W. A. SHAW.
ELECTRICAL CONDUCTOR OR CABLE FOR LIGHTING AND OTHER SYSTEMS.
No. 290,122. Patented Dec. 11, 1883.
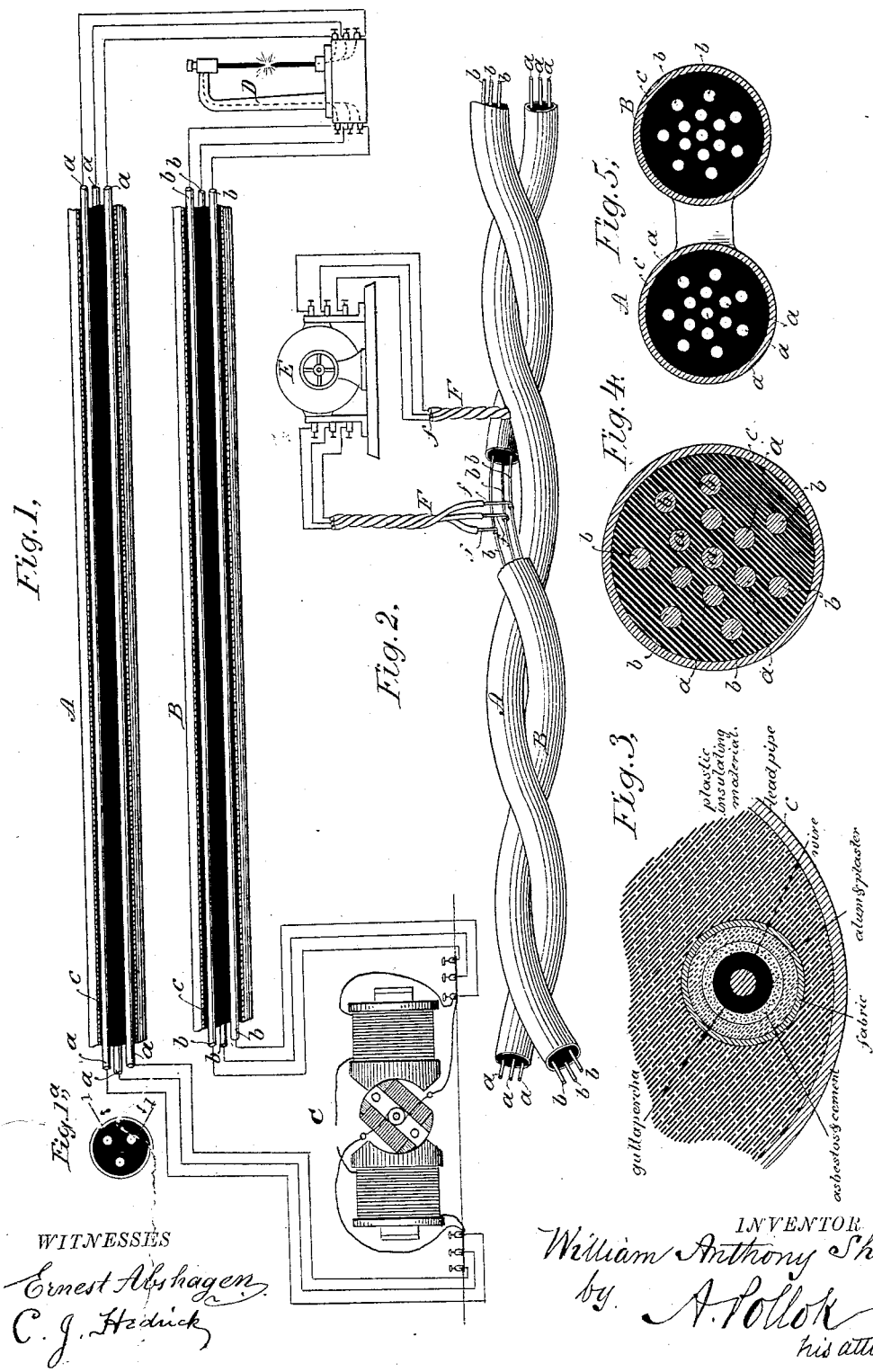

UNITED STATES PATENT OFFICE.

WILLIAM ANTHONY SHAW, OF BROOKLYN, ASSIGNOR OF ONE HALF TO LEBBEUS H. ROGERS, OF NEW YORK, N. Y.

ELECTRICAL CONDUCTOR OR CABLE FOR LIGHTING AND OTHER SYSTEMS.

SPECIFICATION forming part of Letters Patent No. 290,122, dated December 11, 1883.

Application filed March 20, 1882. (No model.)

*To all whom it may concern:*

Be it known that I, WILLIAM ANTHONY SHAW, of Brooklyn, in the county of Kings and State of New York, have invented certain new and useful Improvements in Electrical Conductors or Cables for Lighting and other Systems; and I do hereby declare that the following is a full, clear, and exact description of the invention, which will enable others skilled in the art to which it appertains to make and use the same, reference being had to the accompanying drawings, which form a part of this specification.

This invention relates to conductors or cables for conveying or distributing the heavy or powerful currents from dynamo-electric machines or other source to supply electric lamps, motors, and similar apparatus; and it has for its object to obviate or at least lessen the dangers to life and property liable to occur with the ordinary conductors or cables from accidental breakage, short-circuiting, or grounding of the conductors, or the contact of the same with telephone and telegraph wires or other conductors generally. This object is accomplished in the present invention by the subdivision of the conductors into a number of insulated wires or conductors, which are connected so that the current supplying a single-light motor or other apparatus or a series of them is split up, and by the protection of the insulated wires by fire-proof coverings. With conductors divided as indicated it would be impossible, unless under the most extraordinary circumstances, for all the parts to have their insulation impaired, or to be short-circuited, broken, grounded, or to be put in contact with other lines, and by the subdivision the current is so reduced on each part that should an accident happen to one or more of the parts the effect would be small, and the damage, if any, comparatively light. As an additional protection the wires are enveloped in fire-proof material—such as asbestus and silicate (soluble glass)—and are also embedded in a compound—such as a mixture of alum and plaster, which becomes set by the action of heat.

In the drawings, Figure 1 represents a circuit supplying a single light from a dynamo-electric machine, and provided with subdivided direct and return conductors, the conductors being shown in section on line 1 1, Fig. 1ᵃ, which is a cross-section of one of the conductors. Fig. 2 is a view of a portion of a circuit showing the connections with a motor to be supplied by derivation. Fig. 3 is an enlarged view, in cross-section, showing in detail the means for insulating and protecting the individual wires or conductors; and Figs. 4 and 5 are views in cross-section representing different arrangements of the wires or conductors of the direct and return branches of a circuit.

A is the direct conductor, composed of a series of wires or individual conductors, $a$, insulated from each other and united into a cable; B, the return-conductors, similarly constructed; C, a dynamo-electric machine; D, an electric lamp or light; E, a motor, and F subdivided conductors of the derived branch in which the motor is placed. The wires or individual conductors of the return-conductor B are, for the sake of distinction, lettered $b$, and those of the conductors F $f$.

As shown in Figs. 1 and 1ᵃ and in Fig. 2, the conductors are composed of three wires; in Fig. 4, of seven, and in Fig. 5 of fourteen, and in all they are enveloped in a lead pipe, $c$, or other suitable sheathing. In Fig. 2 the direct and return conductors are twisted to avoid induction therefrom or neighboring conductors. The same result is in part produced by arranging the wires of one conductor inside the wires of the other, as shown in Fig. 4; or other suitable arrangement of the wires may be adopted where it is deemed necessary or desirable to avoid induction.

The several wires $a$ $b$ are surrounded (see Fig. 3) with gutta-percha, then with a fire-proof composition of asbestus and soluble glass or other suitable cementing substance, then with a mixture of powdered alum and plaster held in place with fabric, and the space between the wires inside the sheath $c$ is filled with compounds of asphaltum or other suitable plastic insulating material. The wires prepared with the insulating and fire-proof material and enveloped in fabric can be introduced through holes in the core of a pipe-press, and as the sheath of lead is pressed on, they may be drawn through, the plastic insulating material in a liquid state being at the same time pumped in through the same or through other openings in the core. Other plans can be adopted, the method and means for uniting wires in a cable forming no part of the present invention.

The mixture of alum and plaster may be applied in a dry state or mixed with a suitable cement, such as marine glue or silicate (soluble glass) compounds. It permits the wire surrounded by it to be bent in any direction, while at the same time it retains its position; but in the event of the wire becoming unduly heated or the accidental formation of the "arc," the alum at once melts and sets the plaster, forming a solid fire-proof envelope around the "fault," insulating the same and preventing further damage. The fabric which holds the alum and plaster in place is preferably rendered fire-proof by means of a silicate or tungstate of soda solution or other suitable compound. It can be replaced by metal—a lead pipe, for example—if desired.

Instead of gutta-percha next the wire, asbestus and paraffine or other good insulating medium can be used, and instead of asbestus, other suitable mineral can be used in the fire-proof coating.

It is obvious, therefore, that modifications can be made in details without departing from the spirit of the invention. Portions of the invention can, moreover, be used without the others. For example, a number of ordinary insulated wires, separate or loosely bunched or united in a cable, can be connected to form the direct conductor, and the same or a different number be similarly connected to form the return-conductor. Ordinary conductors can be protected with the fire-proof coating of asbestus and cement or with the plaster and alum mixture or both. Cables or bundles of conductors can be embedded in the alum and plaster inclosed in a trough, box, or other receptacle. The subdivided conductors can be used, or grounded circuits. It is not essential that each light-motor or other apparatus should be connected with all the wires or conductors of the subdivided conductor, nor that the branch conductors should be subdivided, although this is preferable. The several wires or individual conductors, or two or more of them, could be passed through a metal disk, with which contact is made, and the currents for supplying the light or motor be derived thereform. It is also preferred to have all the wires or individual conductors run in straight or approximately straight lines, as shown, although the solenoids can be formed, if desired.

Having now fully described my said invention and the manner of carrying the same into effect, what I claim is—

1. An electrical circuit having both the direct conductor and the return or ground conductor formed of a number of insulated wires or separate conductors connected, substantially as described.

2. The combination, with a dynamo-electric machine or other source of powerful electric currents, a supply or distributing circuit composed of a number of insulated wires or separate conductors connected, and electrical apparatus—such as lamps, motors, and the like—connected in circuit with and supplied from two or more of the insulated wires or separate conductors, substantially as described.

3. In combination with an electrical supply or main distribution circuit, a derived circuit formed of a number of separate insulated wires or conductors connected, substantially as described.

4. An electrical conductor coated with a flexible fire-proof composition of asbestus or similar fire-proof material mixed with a binding-cement, substantially as described.

5. An electrical conductor insulated with gutta-percha or other highly insulating material, and provided outside said material with a composition coating of asbestus or other fire-proof mineral mixed with a binding-cement also of fire-proof material, substantially as described.

6. The combination, with an electric generator and a translating device, of a subdivided cable comprising a number of insulated wires or individual conductors provided with fire-proof material and connected, substantially as described.

In testimony that I claim the foregoing as my own I affix my signature in presence of two witnesses.

WM. ANTHONY SHAW.

Witnesses:
M. M. BUDLONG,
G. W. RAWSON.